US008783208B2

(12) United States Patent
Schroeder et al.

(10) Patent No.: US 8,783,208 B2
(45) Date of Patent: Jul. 22, 2014

(54) POWDER HOPPER WITH QUIET ZONE, A COMBINATION OF A POWDER HOPPER AND A POWDER SPRAY GUN AND A METHOD OF OPERATING A POWDER HOPPER

(75) Inventors: Joseph G. Schroeder, North Royalton, OH (US); Terrence M. Fulkerson, Brunswick Hills, OH (US); Angelo Bellini, Giovenzano (IT); Ralf Scheuffgen, Willich (DE); Claus Ruschitzka, Dorsten (DE)

(73) Assignee: Nordson Corporation, Westlake, OH (US)

( * ) Notice: Subject to any disclaimer, the term of this patent is extended or adjusted under 35 U.S.C. 154(b) by 273 days.

(21) Appl. No.: 13/140,066

(22) PCT Filed: Dec. 16, 2009

(86) PCT No.: PCT/US2009/068238

§ 371 (c)(1),
(2), (4) Date: Jun. 16, 2011

(87) PCT Pub. No.: WO2010/077936

PCT Pub. Date: Jul. 8, 2010

(65) Prior Publication Data

US 2012/0021133 A1 Jan. 26, 2012

Related U.S. Application Data

(60) Provisional application No. 61/138,246, filed on Dec. 17, 2008.

(51) Int. Cl.
*B05C 19/00* (2006.01)
*B64D 1/16* (2006.01)

(52) U.S. Cl.
USPC ......... 118/308; 118/303; 118/DIG. 5; 141/67

(58) Field of Classification Search
USPC ................ 118/308, 309, 620–640, 303, 326, 118/DIG. 5; 222/226, 547, 252, 370, 636, 222/195; 427/180, 182; 55/DIG. 46
See application file for complete search history.

(56) References Cited

U.S. PATENT DOCUMENTS 3,791,341 A 2/1974 Diamond et al.
3,826,540 A * 7/1974 Jensen .......................... 406/123

(Continued)

FOREIGN PATENT DOCUMENTS

EP 0974400 1/2000
GB 2310816 9/1997

(Continued)

OTHER PUBLICATIONS

International Search Report for International Application Serial No. PCT/US2009/068238 dated Jun. 16, 2010.

(Continued)

*Primary Examiner* — Yewebdar Tadesse
(74) *Attorney, Agent, or Firm* — Calfee, Halter & Griswold LLP

(57) ABSTRACT

A powder hopper is provided with a low turbulence zone for supplying powder to a spray gun. The low turbulence zone is defined by a baffle inside the hopper with the low turbulence zone being within a volume of the baffle, and an annular zone between the baffle and the hopper is used to bulk feed powder into the hopper. The low turbulence zone may alternatively be in the annular zone with powder added to the volume of the baffle. One preferred application for this hopper is in connection with the use of fine powder coating materials to coat the interior of small diameter cans.

12 Claims, 15 Drawing Sheets

(56) References Cited

U.S. PATENT DOCUMENTS

| | | | | | |
|---|---|---|---|---|---|
| 4,730,647 | A | | 3/1988 | Mulder | |
| 5,603,566 | A | * | 2/1997 | O'Ryan et al. | 366/107 |
| 5,654,042 | A | * | 8/1997 | Watanabe et al. | 427/459 |
| 5,743,958 | A | * | 4/1998 | Shutic | 118/308 |
| 7,247,205 | B2 | | 7/2007 | Shutic | |
| 2007/0235558 | A1 | | 10/2007 | Ballu et al. | |

FOREIGN PATENT DOCUMENTS

| | | |
|---|---|---|
| JP | 51-152019 | 5/1975 |
| JP | H08-119455 | 5/1996 |
| JP | 2001-293422 | 10/2001 |
| WO | 92/02349 | 2/1992 |

OTHER PUBLICATIONS

Written Opinion for International Application Serial No. PCT/US2009/068238 dated Jun. 16, 2010.

International Preliminary Report on Patentability for International Application Serial No. PCT/US2009/068238 dated Jun. 21, 2011.

Office action from Japanese Application No. 2011-542375 dated Nov. 14, 2013.

* cited by examiner

POWDER HOPPER WITH QUIET ZONE, A COMBINATION OF A POWDER HOPPER AND A POWDER SPRAY GUN AND A METHOD OF OPERATING A POWDER HOPPER

RELATED APPLICATIONS

The present application is a national phase entry under 35 U.S.C. §371 and claims priority to International Application No. PCT/US2009/068238, with an International Filing Date of Dec. 16, 2009, for POWDER HOPPER WITH QUIET ZONE, A COMBINATION OF A POWDER HOPPER AND A POWDER SPRAY GUN AND A METHOD OF OPERATING A POWDER HOPPER, which claims priority to U.S. Provisional Patent Application Ser. No. 61/138,246, filed Dec. 17, 2008, for POWDER HOPPER WITH QUIET ZONE, the disclosures of which are all fully incorporated herein by reference.

TECHNICAL FIELD OF THE INVENTIONS

The present disclosure relates to powder coating systems that use a hopper for supplying or feeding powder to one or more coating application devices. More particularly, the disclosure relates to powder coating hoppers that produce a fluidized supply of powder, and also separately relates to powder coating equipment that may be used with such hoppers.

BACKGROUND OF THE DISCLOSURE

In powder coating systems, powder coating material is commonly transferred from a bulk supply or supply hopper to a feed hopper, and then a pump is used to convey the powder from the feed hopper to one or more application devices, such as, for example, a spray gun. A feed hopper is commonly a fluidized hopper which fluidizes the powder coating material before it is pumped to a spray gun or application device. For some powder coating applications, a very fine powder coating material must be used to achieve the desired surface finish or other coating property. While there are various applications in which powder coating equipment suitable for fine powders are useful, one example is a powder coating system for the inside coating of small diameter tube shaped containers.

SUMMARY OF THE DISCLOSURE

In accordance with an embodiment of one of the inventions presented in this disclosure, a hopper for powder coating material comprises a hopper body, a fluidizing bed, a cover, and a baffle that is disposed inside the hopper body. A powder inlet is disposed between the baffle and the hopper body, with the baffle functioning to provide a low turbulence zone for fluidized powder. In a more specific embodiment the hopper body and baffle are cylindrical, so that an annular region is provided therebetween, with the powder inlet disposed in the annular region. Alternatively, the annular region may be the low turbulence zone with powder added inside the baffle. In another embodiment, the axial length of the baffle is such that a lower gap is provided between the baffle and the fluidizing bed, and an upper gap is provided between the baffle and the cover. In additional alternative embodiments, an optional agitator may be provided near the fluidizing bed in the region of the lower gap, one or more optional venting pumps may be used to keep the hopper at a negative pressure, an optional switch may be used to deactivate an optional air motor when the cover is separated from the hopper body, and one or more pumps may be used to pump fluidized powder from the low turbulence zone to one or more coating material application devices.

This disclosure also presents one or more inventions relating to a powder coating material application device and a nozzle therefor. In one embodiment, the nozzle may comprise a plurality of discrete flow passages disposed about a longitudinal axis of the nozzle.

The disclosure also presents one or more inventions relating to a powder coating material application system that utilizes the hopper as set forth above, a coating material application device as set forth above, and the combination thereof.

The disclosure also presents one or more inventions relating to a method for operating a powder supply hopper wherein the method includes the steps of venting air from an internal volume at a higher rate when powder is being added to the volume and at a lower rate to vent fluidizing air from the volume.

These and other aspects and advantages of the inventions disclosed herein will be understood by those skilled in the art from the following detailed description of the exemplary embodiments in view of the accompanying drawings.

DESCRIPTION OF THE EXEMPLARY EMBODIMENTS

Figure 1:
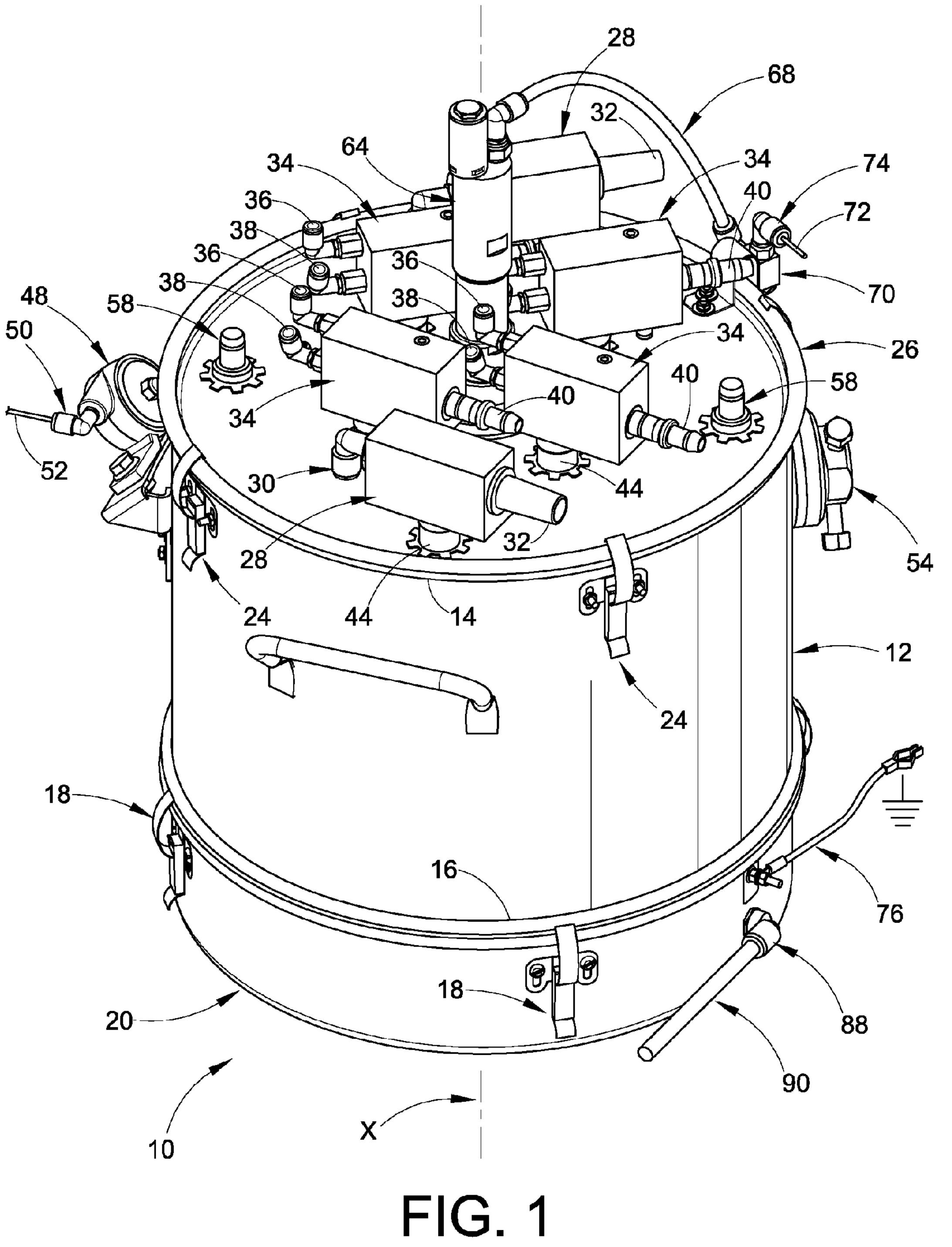
FIG. 1 is an embodiment of a fluidizing hopper in accordance with one or more of the inventions herein, illustrated in isometric view.

The inventions are described herein with particular reference to exemplary illustrations and embodiments, however, the inventions are not limited to such exemplary embodiments. For example, the hopper concepts may be used with many different configurations of the hopper and associated optional components, and from a system standpoint may be used with many different types of coating material application devices, pumps, bulk feed and control systems, all of which are well known or may be later developed. The application device and nozzle concepts may be used with many different hopper arrangements, pumps and so on, including the embodiments illustrated herein. While the exemplary embodiments are illustrated and discussed in terms of a coating application system for small diameter tube shaped containers, other container shapes and types may alternatively be coated.

While various inventive aspects, concepts and features of the inventions may be described and illustrated herein as embodied in combination in the exemplary embodiments, these various aspects, concepts and features may be used in many alternative embodiments, either individually or in various combinations and sub-combinations thereof. Unless expressly excluded herein all such combinations and sub-combinations are intended to be within the scope of the present inventions. Still further, while various alternative embodiments as to the various aspects, concepts and features of the inventions—such as alternative materials, structures, configurations, methods, circuits, devices and components, software, hardware, control logic, alternatives as to form, fit and function, and so on—may be described herein, such descriptions are not intended to be a complete or exhaustive list of available alternative embodiments, whether presently known or later developed. Those skilled in the art may readily adopt one or more of the inventive aspects, concepts or features into additional embodiments and uses within the scope of the present inventions even if such embodiments are not expressly disclosed herein. Additionally, even though some features, concepts or aspects of the inventions may be described herein as being a preferred arrangement or method, such description is not intended to suggest that such feature is required or necessary unless expressly so stated. Still further, exemplary or representative values and ranges may be included to assist in understanding the present disclosure, however, such values and ranges are not to be construed in a limiting sense and are intended to be critical values or ranges only if so expressly stated. Moreover, while various aspects, features and concepts may be expressly identified herein as being inventive or forming part of an invention, such identification is not intended to be exclusive, but rather there may be inventive aspects, concepts and features that are fully described herein without being expressly identified as such or as part of a specific invention, the inventions instead being set forth in the appended claims. Descriptions of exemplary methods or processes are not limited to inclusion of all steps as being required in all cases, nor is the order that the steps are presented to be construed as required or necessary unless expressly so stated.

With reference to FIG. 1, an embodiment of a hopper 10 in accordance with one or more of the inventions herein is illustrated. This hopper 10 may be used for supplying fluidized powder coating material to one or more application devices (see FIG. 5, for example) and as such may be also referred to herein as a supply hopper. However, no limitation should be construed as to the term supply hopper, and the hopper 10 may be used in any use or application it which it is desired to provide fluidized powder coating material to a downstream application or use, including to another hopper to name one example. The various parts of the hopper such as the hopper body, cover and the baffle (to be described herein below) may be made of any suitable material such as, for example, stainless steel.

The hopper 10 includes a hopper body 12 which may be in the form of a right cylinder having an upper end 14 and a lower end 16. Clamps or straps 18 or other suitable attachment means may be used to join a fluidizing drum 20 to the lower end 16 of the hopper body 12. A fluidizing subassembly 22 which may include the hopper body 12 and the fluidizing drum 20 is illustrated in greater detail in FIGS. 2A, 2B and 3 as described hereinbelow.

Clamps or straps 24 or other suitable attachment means, which may be but need not be the same as the clamps 18, may be used to join a cover 26 to the upper end 14 of the hopper body 12. The cover, 26, when fully installed for operation, seals the hopper 10 and also supports various pumps, an air motor and related equipment used with the hopper 10 assembly. For example, one or more optional venting pumps 28 may be disposed on the cover 26. These venting pumps 28 may be used to reduce pressure buildup within the hopper 10, and in particular may optionally be used to maintain the hopper 10 interior at a somewhat negative pressure, for example, on the order of less than about three inches mercury. Although two venting pumps 28 are illustrated in FIG. 1, more may be used, or only a single venting pump 28 may be used, or in some cases the venting pumps may be omitted, especially if there are other means for preventing over-pressurizing the hopper 10. In FIG. 1 the venting pumps 28 are shown approximately diametrically opposed each other so as to maintain good pressure balance within the hopper 10. Each venting pump 28 may be realized, for example, in the form of a conventional Venturi pump having a pressurized air inlet fitting 30 and an outlet 32. The venting pumps 28 will tend to withdraw not only fluidizing and transport air but also some powder, therefore, a hose (not shown) will be connected to the outlet 32 to capture the powder and feed it back to the bulk supply or to waste. Air flow may be controlled to the venting pumps inlets 30 so as to control how much air is being vented from the hopper 10, as will be further described herein. For Venturi-type venting pumps 28, the higher the air flow to the inlets 30, the greater the suction is created to vent air from the hopper 10.

Also disposed on the cover 26 are one or more feed pumps 34, in this example four are shown. The feed pumps 34 are used to suck fluidized powder from the hopper 10 and pump the powder to one or more application devices (see FIG. 5), such as, for example, an automatic or manual powder spray gun. The feed pumps 34 illustrated are conventional Venturi type pumps, but other pump designs may be used, including but not limited to dense phase pumps. Each pump 34 includes a flow air inlet fitting 36 and an optional fluidizing air inlet fitting 38, as well as an outlet hose connector 40. The outlet hose connector 40 receives a feed hose 42 (FIG. 5) so as to pump fluidized powder coating material to an application device (one such use shown in FIG. 5), or the feed pumps 34 may optionally be used to transfer the fluidized powder coating material to another downstream use, including another hopper, for example.

Figure 5:
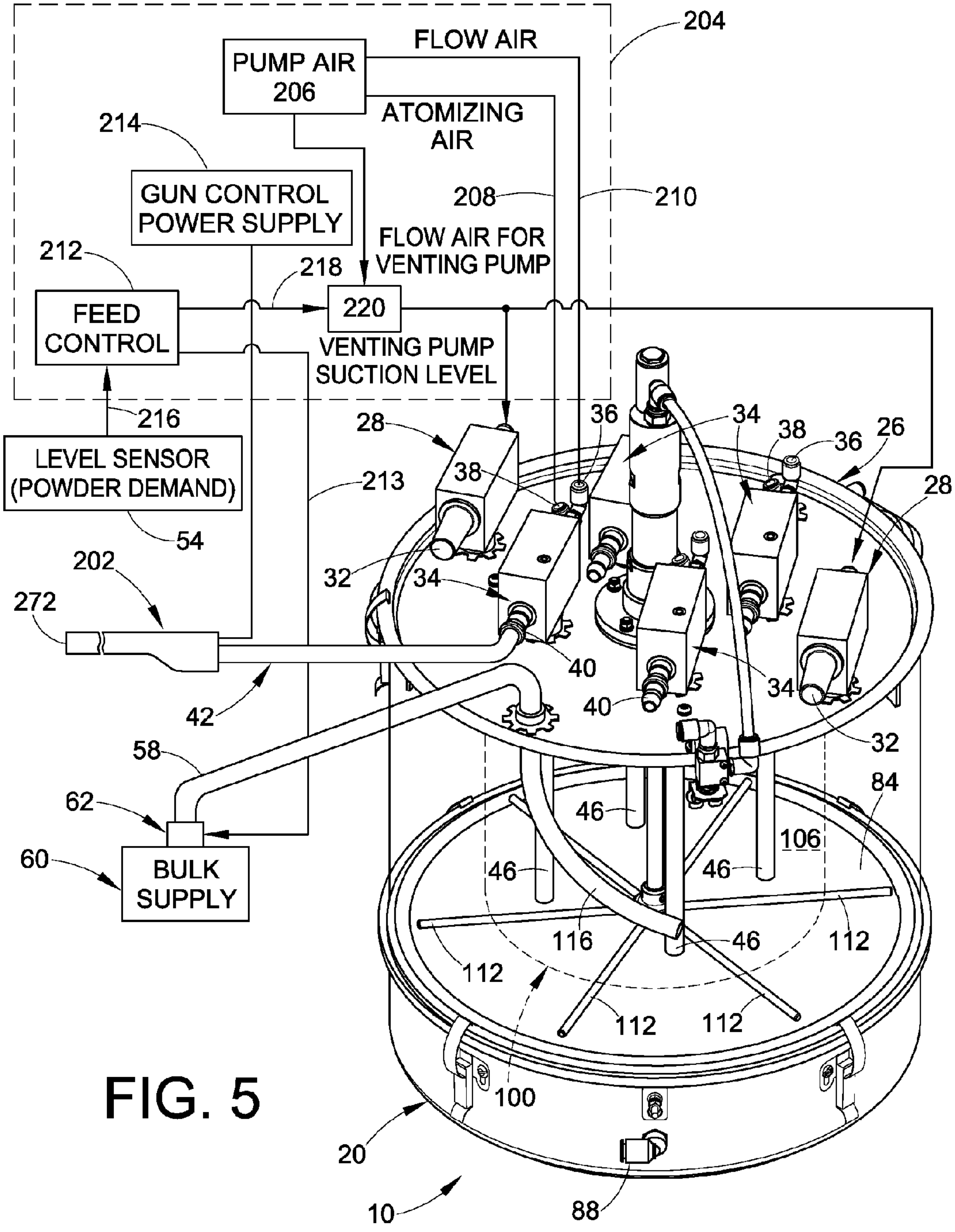
FIG. 5 is another isometric view of the embodiment of FIG. 1 with the hopper body and baffle shown transparent, and illustrating an embodiment of a complete coating material application system.
Figure 9:
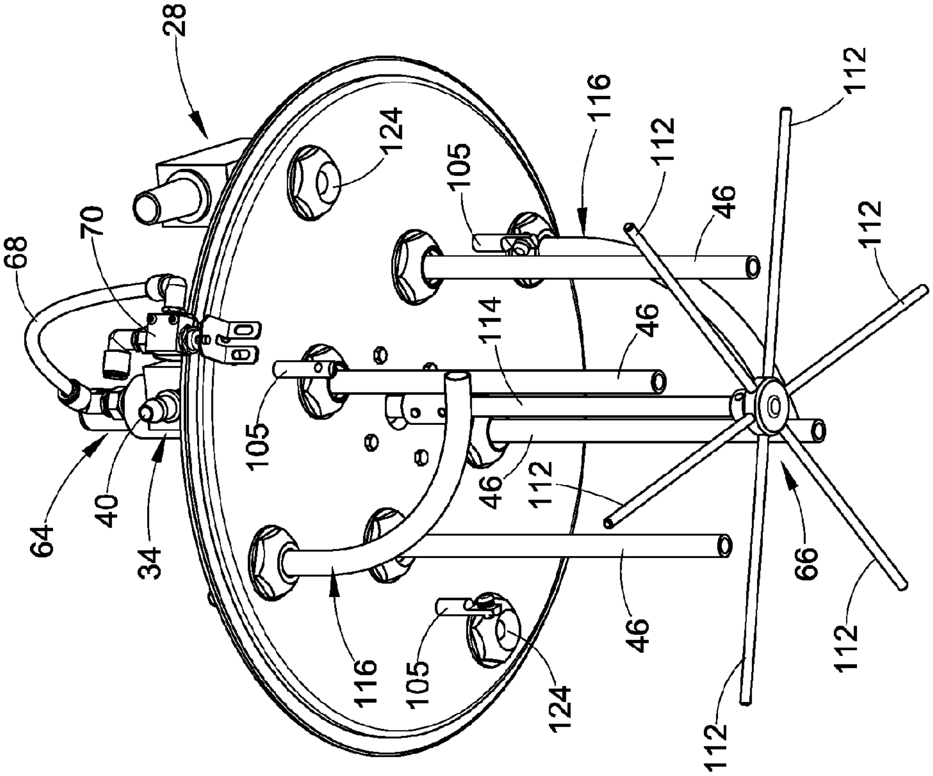
FIG. 9 is a lower view of the subassembly of FIG. 8.

Each feed pump 34 further includes a suction tube connection 44 which connects a suction tube 46 (FIGS. 5 and 9). Each feed pump 34 operates to create a low pressure zone in the pump body that is in fluid communication with its associated suction tube, so as to suck fluidized powder up into the pump from the hopper 10. Flow air 210 (FIG. 5) is used to create this suction and to push the fluidized powder out each pump to its associated application device 202 (FIG. 5) through the feed hose 42.

Still referring to FIG. 1, an optional air motor driven vibrator 48 is provided, which includes an air fitting 50 to which is connected a pressurized air hose 52. As best illustrated in FIG. 2B, the vibrator is preferably although not necessarily mounted at a forty-five degree angle on the outside of the hopper body 12.

A level sensor arrangement 54 may be provided on the outside of the hopper body 12 and may be conventional in design as needed. A suitable level sensor is part no. 237199 available from Nordson Corporation, Westlake, Ohio, but other level sensors may be used as needed. The level sensor is used to detect the level of fluidized powder in the hopper and produce a signal when powder coating material needs to be added to the hopper 10. In many system applications, powder will be consumed from the hopper 10 in a continuous or near continuous mode, so that the level sensor 54 provides the necessary feedback as to when there is a demand for powder to be added.

At least one, and in the exemplary embodiments herein there are two, powder inlet connection 56 is provided, in this example in the cover 26. Each powder inlet connection 56 is connectable to a supply hose 58 (FIG. 5) that provides powder coating material from a bulk feed supply 60 or other source of powder coating material. Typically, one or more bulk powder supply pumps 62 will be used to supply powder coating material to the hopper 10 when there is a demand signal issued by the level sensor 54. Each supply pump 62 may be, for example, a Venturi pump. More than two powder inlet connections 56 may be used as needed. As with the venting pumps 28, if two powder inlets are used, they preferably although not necessarily add powder into the hopper 10 at diametrically opposite sides of the hopper to help maintain balance and even powder distribution for better fluidization and consistent powder flow from the feed pumps 34. If more than two powder inlets will be used, they would be preferably although not necessarily evenly radially spaced about the hopper 10.

Finishing with the FIG. 1 illustrated components, an agitator air motor 64 may be disposed on the cover 26, preferably although not necessarily in the middle of the cover 26. The agitator air motor 64 is used to turn an agitator 66 (FIGS. 4, 5 and 9 for example) to assist in fluidizing the powder coating material. The agitator air motor 64 operates from pressurized air provided by air tubing 68. A switch function 70, such as for example a limit switch, may be used to interrupt pressurized air supplied from a source (such as shop air for example) via an air hose 72 to an air inlet fitting 74, should an operator or other personnel move, loosen, separate or otherwise remove the cover 26. This will prevent the agitator motor 64 from operating if the cover 26 has been separated from the hopper body 12. A grounding strap 76 may be used in a conventional manner to electrically ground the hopper 10.

Figure 3:
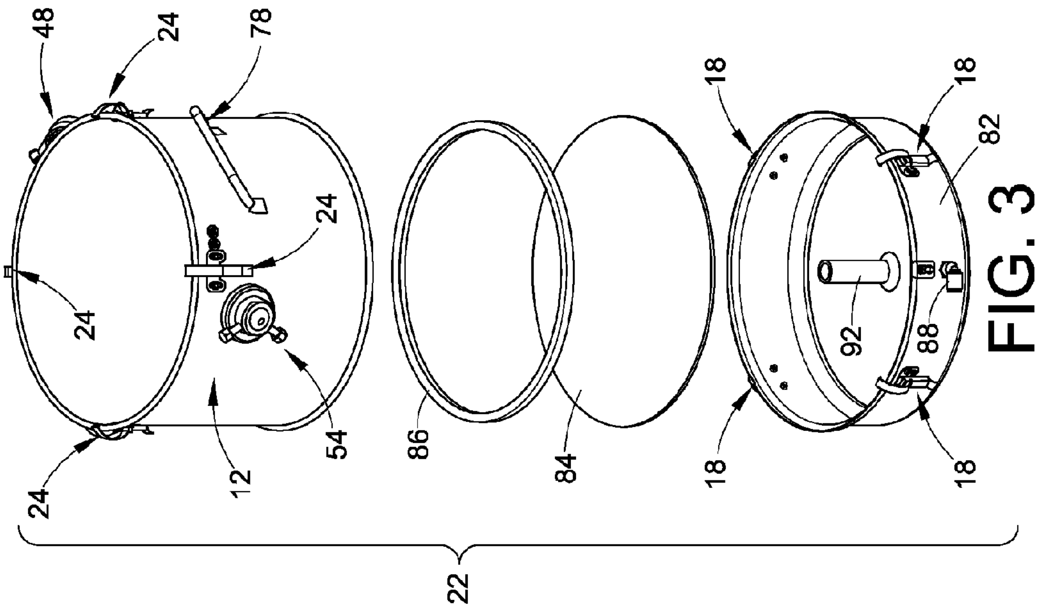
FIG. 3 is an exploded isometric view of the embodiment of FIG. 2A.
Figure 2A:
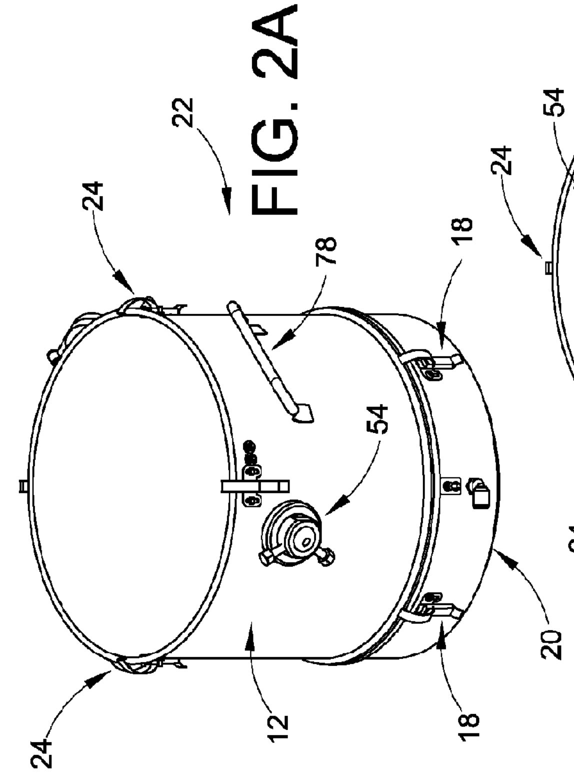
FIGS. 2A and 2B are two rotated isometric views of an embodiment of a hopper body and fluidizing arrangement as may be used in the FIG. 1 embodiment.
Figure 2B:
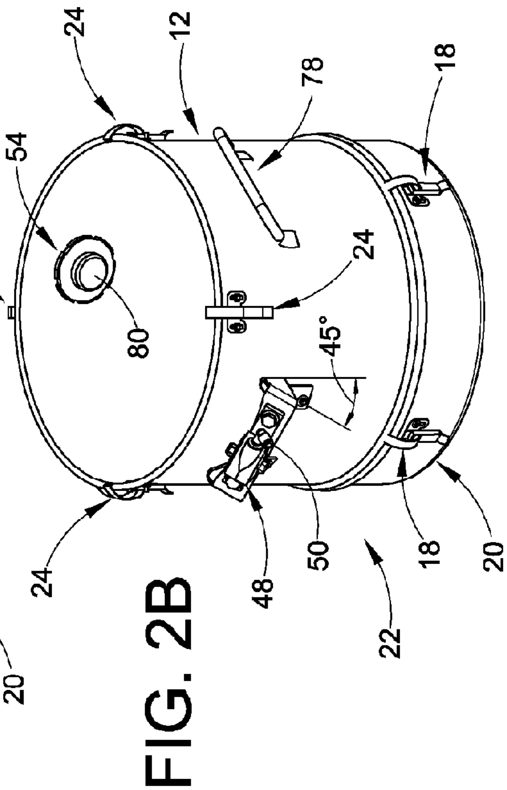

FIGS. 2A, 2B and 3 illustrate the hopper body 12 and the fluidizing subassembly 22 in simpler views. The hopper body 12 may be provided with handles 78 (only one is viewable in these figures) to ease transporting and positioning the hopper 10. The level sensor arrangement 54 provides a sensing port 80 to the hopper 10 interior. The fluidizing drum 20 may include a housing 82 that supports a fluidizing plate 84. A suitable gasket or seal 86 may be used to provide a fluid tight seal between the fluidizing bed 20 and the lower end of the hopper body 12. The fluidizing plate 84 may comprise any porous material that allows air flow there through to fluidize the powder coating material added into the hopper 10 above the plate 84. A suitable material for the fluidizing plate 84 is polyethylene, as is well known. The housing 82 includes a fluidizing air fitting 88 that is connectable to a fluidizing air hose 90 (FIG. 1). Fluidizing air enters the drum 20 through the fitting 88 and into the housing 82 so that pressurized fluidizing air evenly flows up through the fluidizing plate 84. A post or standoff 92 may be used to support the fluidizing plate 84 against sagging or falling through the gasket 86 due to weight of powder on top of the plate 84.

Figure 4:
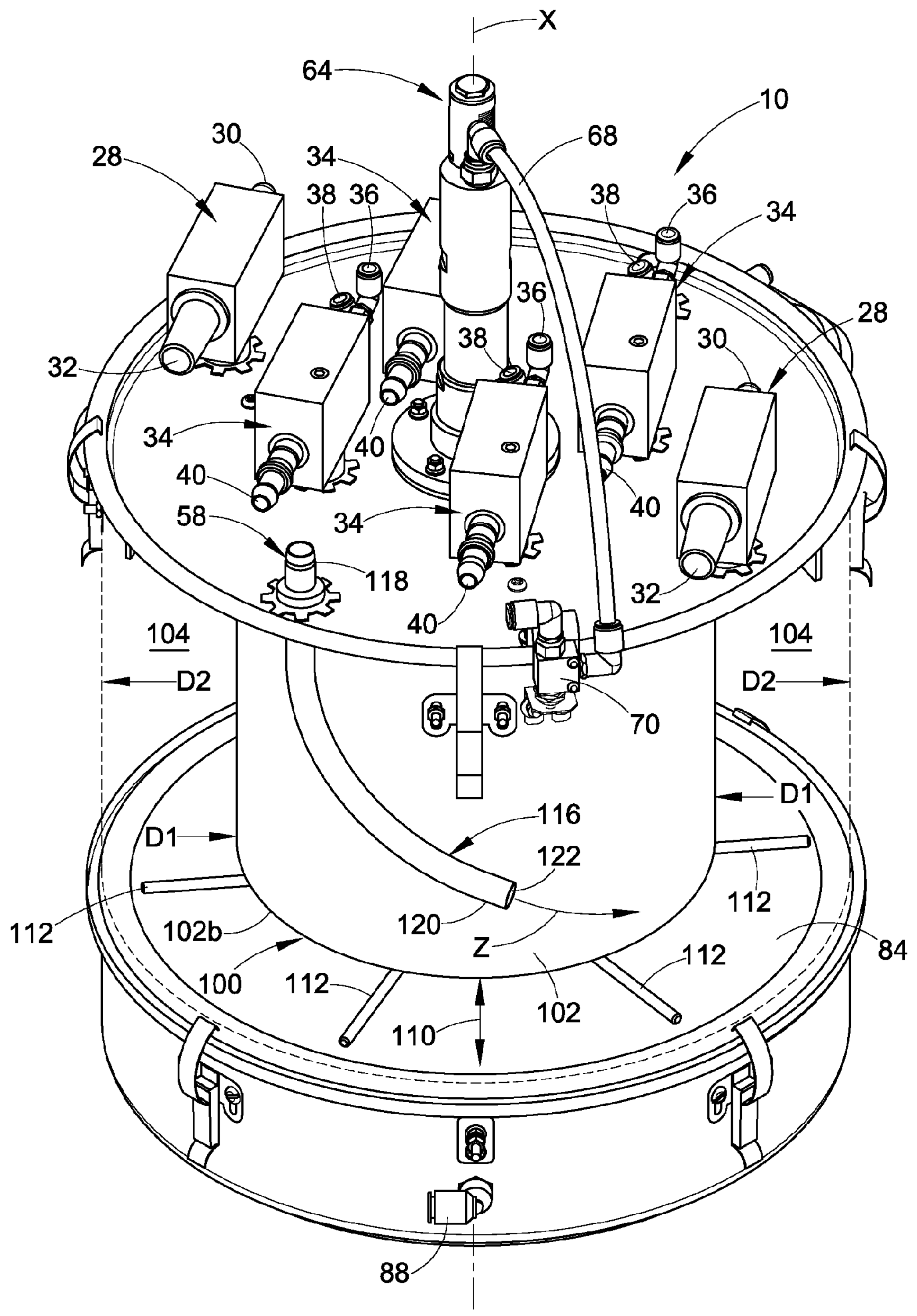
FIG. 4 is another isometric view of the embodiment of FIG. 1 with the hopper body shown transparent.
Figure 6:
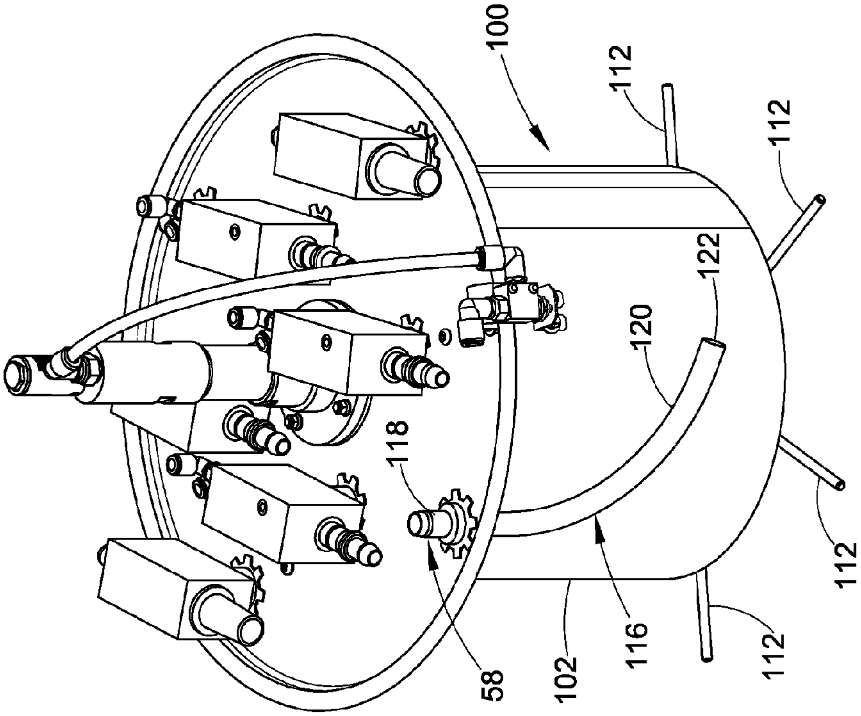
FIG. 6 is an upper view of a cover and baffle subassembly as used in the embodiment of FIG. 1.
Figure 7:
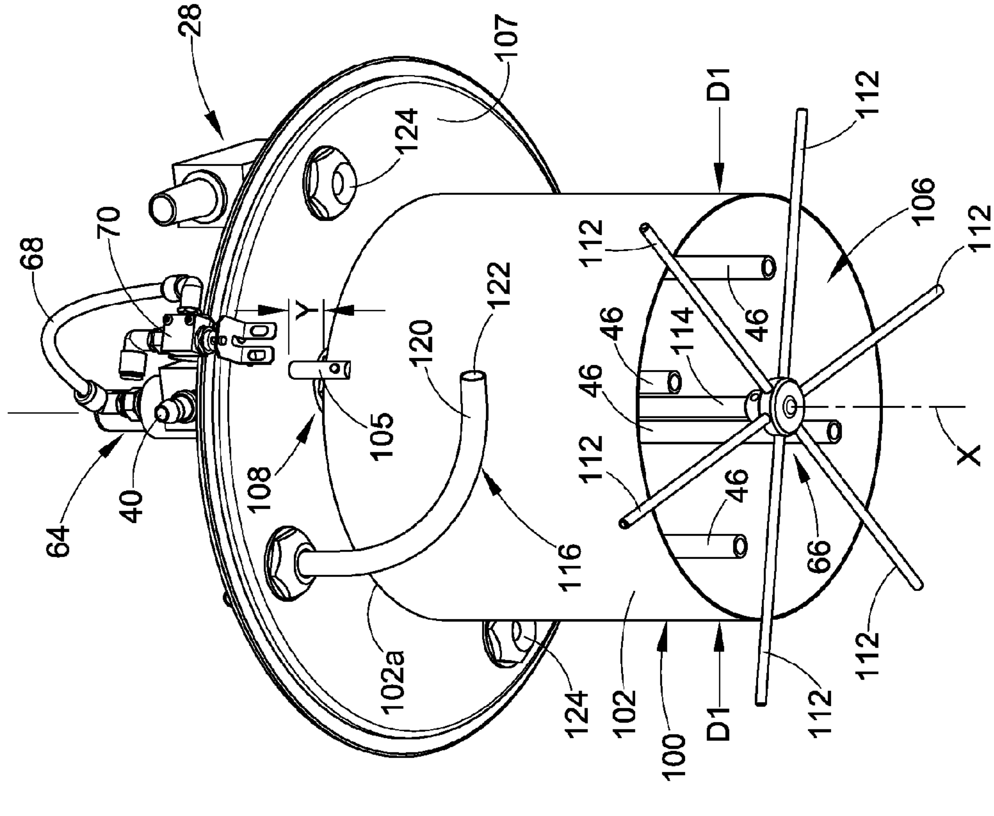
FIG. 7 is a lower view of the subassembly of FIG. 6.

With reference to FIGS. 4, 6 and 7, the hopper 10 further includes a baffle 100. The baffle 100 in this example comprises an open ended right cylinder baffle body 102 that may be supported within the hopper body 12 such as by studs 105 (FIG. 7) that are attached to the underside of the cover 26. The baffle body 102 has an outside diameter D1 that is less than the inside diameter D2 of the hopper body 12. With D1<D2, and with the baffle body 102 preferably generally centered within the hopper body 12, an annular region 104 for adding powder coating material is provided between the baffle 100 and the hopper body 12. The annular region 104 is used for adding or supplying powder coating material to the hopper 10 so that the baffle 100 defines an interior quiet zone or low turbulence zone 106 (see FIGS. 5 and 7) within the volume of the cylindrical baffle body 102 that is generally isolated from the turbulence and higher flow of the added powder coating material. The suction tubes 46 for the feed pumps 34 extend down into this quiet low turbulence zone 106 (in other words, the suction tubes 46 extend down within the baffle 100, see FIG. 7) so that a uniformly distributed and low turbulence supply of fluidized powder is sucked up by the feed pumps 34 to the application devices.

Figure 5A:
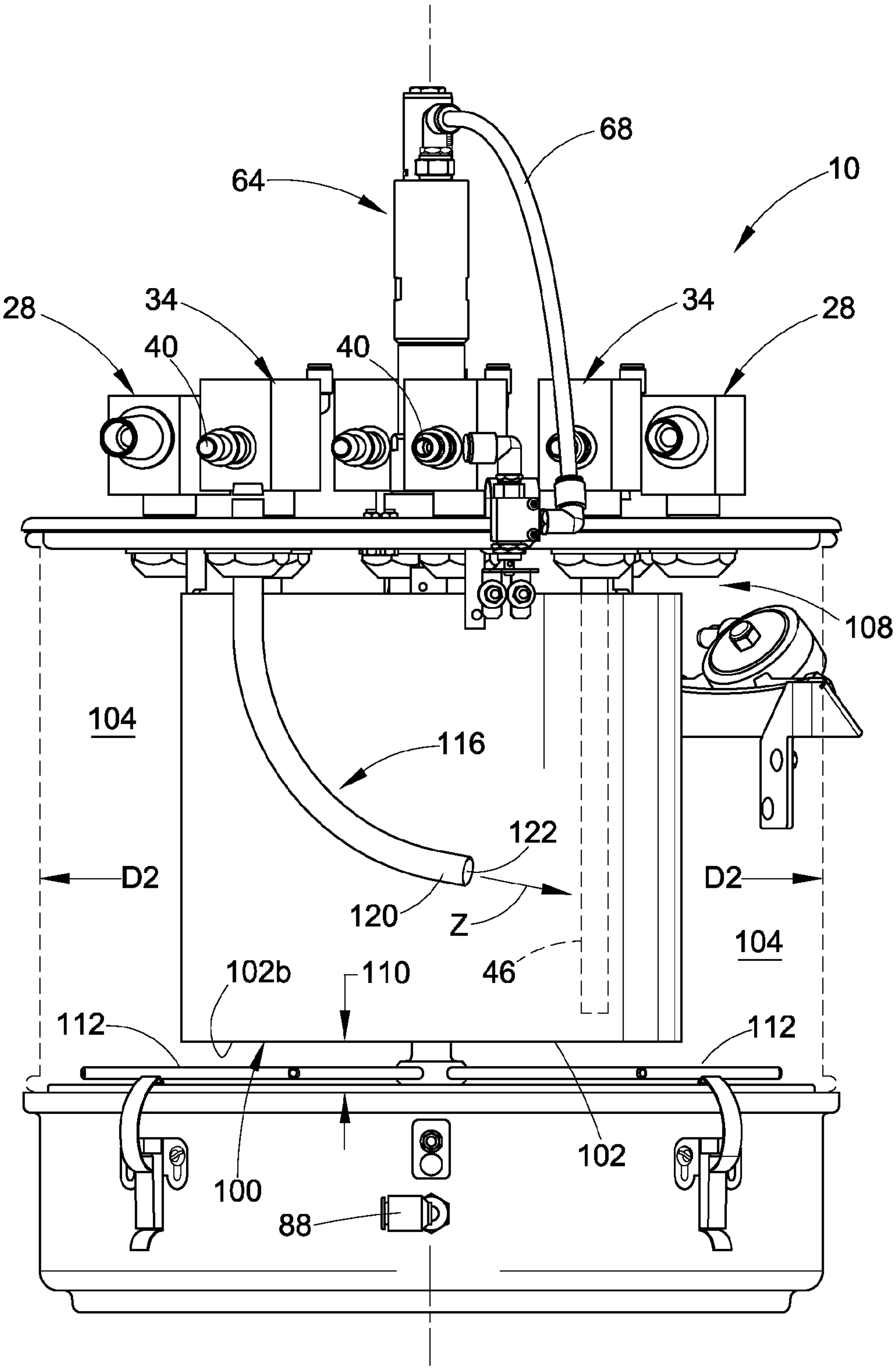
FIG. 5A is an elevation view of the embodiment of FIG. 1 with the hopper body and baffle shown transparent.
Figure 8:
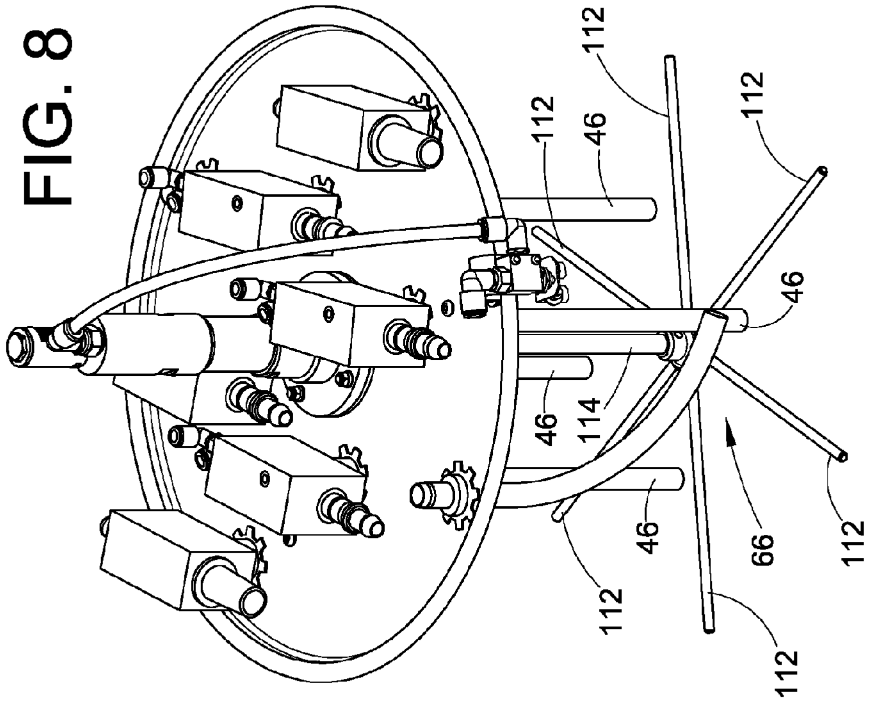
FIG. 8 is an upper view of a cover, agitator and suction tube subassembly as used in the embodiment of FIG. 1.

As illustrated in FIG. 4, the hopper 10 has a central longitudinal axis X, which, for example, the agitator 66 extends along down into the hopper 10. The studs 105 provide an axial offset Y (FIG. 7) between the upper end 102*a* of the baffle body 102 and the lower surface 107 of the cover 26. This axial offset Y provides an upper gap 108 (FIG. 5A) to allow pressure equalization within the hopper 10. This upper gap 108 may be on the order, for example, of about 0.8 inches for a hopper 10 of inside diameter of about 16 inches, but these numbers are only exemplary and may be changed as needed for a particular application.

The axial length of the baffle body 102 is also selected so as to allow for a lower gap 110 between a lower end 102*b* thereof and the fluidizing plate 84. This lower gap 110 allows powder coating material to flow into the interior region or low turbulence zone 106 of the baffle 100, and accommodates agitator arms 112 that are part of the agitator 66. The agitator arms 112 in this example may extend out from the main agitator shaft 114 like spokes on a wheel, so as to help fluidize and uniformly distribute powder coating material as the agitator 66 rotates. The agitator arms 112 preferably although not necessarily extend radially beyond the outer perimeter of the baffle 100 so as to stir the fluidized powder over most or all of the surface of the fluidizing plate 84 including within the low turbulence zone 106 and the annular zone 104. The agitator arms 112 may be disposed fairly near the surface of the fluidizing plate 84 and extend through the lower gap 110. The suction tubes 46 preferably although not necessarily extend axially down to near but above the lower end 102*b* of the baffle body 102, so as not to be exposed to the more turbulent flow that is present in the annular region 104 (as shown in phantom in FIG. 5A).

Inlet tubes 116 may be used to add powder coating material into the annular region 104. In the exemplary embodiments herein, two inlet tubes 116 are provided. Each inlet tube 116 has a first end 118 that extends up into its associated powder inlet connection 58, and a second end 120 that is positioned within the annular region 104. The second ends 120 thus present outlet openings 122 through which powder coating material is supplied to the hopper 10 within the annular region 104. These openings 122 preferably although not necessarily are positioned axially above the lower end 102*b* of the baffle body 102 so as to reduce turbulence in the quiet zone 104. These outlet openings 122 are preferably although not necessarily diametrically opposite each other, and if more than two inlet tubes are used, preferably evenly distributed about the circumference of the annular region. In some designs, however, a single inlet tube may be used. Using more than one inlet tube 116 allows for less delivery air volume to reduce over pressure, and also allows for a lower inlet air and powder velocity.

As best illustrated in FIGS. 4 and 6, the inlet tubing 116 may have a gentle radius curvature to it so as to reduce impact fusion of powder coating material against the internal surface of the tubes. Also, the tubes 116 are disposed so that powder coating material exiting through the outlet openings 122 has a downward directional component, while at the same time entering the annular region 104 generally tangentially so that added powder coating material flows in a downward helical direction represented by the arrow Z (FIG. 4) toward the lower gap 110. Although these flow orientations are optional, they tend to provide more uniform powder distribution and also assist the powder particles to decelerate as they move towards the fluidizing plate 84 and the lower gap 110.

The inlet tubes 116 each introduce powder coating material into the annular region 104 preferably in the same direction of rotation Z. Optionally, but preferably, the agitator 66 is rotated in this same direction Z. The direction Z may be clockwise or counterclockwise as needed. In an exemplary hopper 10, fluidizing air flow may be about 3-4 cubic feet per minute (cfm), while the bulk air flow for adding powder coating material into the annular region 104 may be about 5-6 cfm. The agitator may rotate at any suitable speed, and we have found 90-100 rpm works well.

As noted hereinabove, in many applications it may be preferred to maintain a negative pressure inside the hopper 10 for containment and to prevent over-pressurizing the hopper 10. Too much pressure inside the hopper may have deleterious effects on fluidization of the powder, powder flow rate to the spray guns, powder density and uniformity, and may also adversely affect operation of the Venturi pumps 34 which pull powder from the hopper with suction and, therefore, may be affected by the internal hopper pressure. Even when powder coating material is not being added, the venting pumps 28 may be operated so as to reduce pressure within the hopper 10 that may otherwise build up due to the fluidizing air from the fluidizing plate 84. When powder coating material is added to the hopper 10, the venting pumps 28 will typically need to vent even more air because of the increase in air flow into the hopper 10 from the bulk supply pumps 62.

As best viewed in FIG. 9, each venting pump 28 has a suction inlet that is in fluid communication with a port 124 that is open to the hopper interior volume so as to suck air from the upper region of the hopper 10 as needed to maintain preferably though not necessarily a slightly negative pressure within the hopper 10.

With reference to FIG. 5, an overall powder coating material application system 200 may include the bulk supply 60, one or more material application devices 202, a supply hopper such as, for example the exemplary hopper 10 described herein, and a control circuit or system 204. The material application device 202 may be any suitable spray gun for example as are well known in the art. Another suitable application device is described herein below. The control circuit or system 204 may be realized using hardware and software as needed, and control systems for powder coating material application systems are well known in the art. Such control systems typically include one or more functions such as, for example, an air control function 206 for supplying the atomizing air 208 and flow air 210 to the feed pumps 34; a bulk feed control function 212 for operating the bulk feed pump 62 at the appropriate times, particularly when powder coating material is demanded to the hopper 10. For electrostatic coating systems, the control system 204 typically will also include an electrical power and gun control functions 214. All of these system control functions are well known in the art.

Moreover, in accordance with one of the inventions herein, the control circuit 204 may include with the bulk feed control input signal 216 from the level sensor 54. This signal may be used to indicate a demand for powder into the hopper 10. When powder needs to be added, the feed control 212 activates via control line 213 the bulk supply pump 62 which may use transport air to move powder from the bulk supply 60 into the hopper 10 via the inlet tubes 116. The feed control 212 (or another control circuit or function as needed) may also be used to control operation of the venting pumps 28. As noted above, for Venturi-type venting pumps, the air flow or suction pulled by the venting pumps 28 may be controlled by the flow air to the pump inlets 30. The feed control 212 may use a venting pump control signal 218 to operate a control valve 220. The control valve 220 may be used to deliver two different pressures or air flow rates 222 to the venting pump inlets 30. When powder is not being added to the hopper 10, the venting pumps 28 may be operated at a lower or idle suction rate, for example, about 3-4 cfm. This lower suction is used to remove fluidizing air so as to maintain a negative pressure within the hopper 10. When powder is added, however, in addition to the fluidizing air there is transport air added with the powder feed from the feed pumps 62. Therefore, the feed control 212 may be used to switch the control valve 220 so as to increase the flow air 222 to the venting pump inlets 30 to increase the suction, for example, to about 7-8 cfm. The amount of venting suction for any given system will depend in part on the fluidizing air flow rate and the flow rate of air for transporting powder from the pumps 62 to the hopper 10. The increased flow air to the venting pumps 28 increases the suction of the venting pumps 28 to pull more air from the hopper 10 as powder is being added. When powder feed stops, the venting pumps 28 may be returned to the idle suction rate.

The amount of increased venting suction needed when powder is added to the hopper 10, as well as the idle suction needed when powder is not being added, will be a function of many factors including but not limited to the amount of fluidizing air, size of the hopper, properties of the powder material such as density and particle size, amount of transport air, feed rates into the hopper and so on. Accordingly, for each set-up, the required idle suction and increased suction may be determined empirically and pre-set into the venting control system 204 as part of the set-up procedures.

Alternatively, pressure sensors (not shown) that monitor internal pressure in the hopper 10, such as near the cover 26, for example, may be used to provide a closed loop pressure feedback control in order to maintain the desired internal hopper pressure when powder is being added and when powder is not being added. The pressure sensor feedback signals may be used to control either fluidizing air flow, the venting pump 28 suction, or both. As still another alternative, pressure data could be viewed and manual adjustments made to control the fluidization air flow, the venting pump suction, or both.

Figure 10:
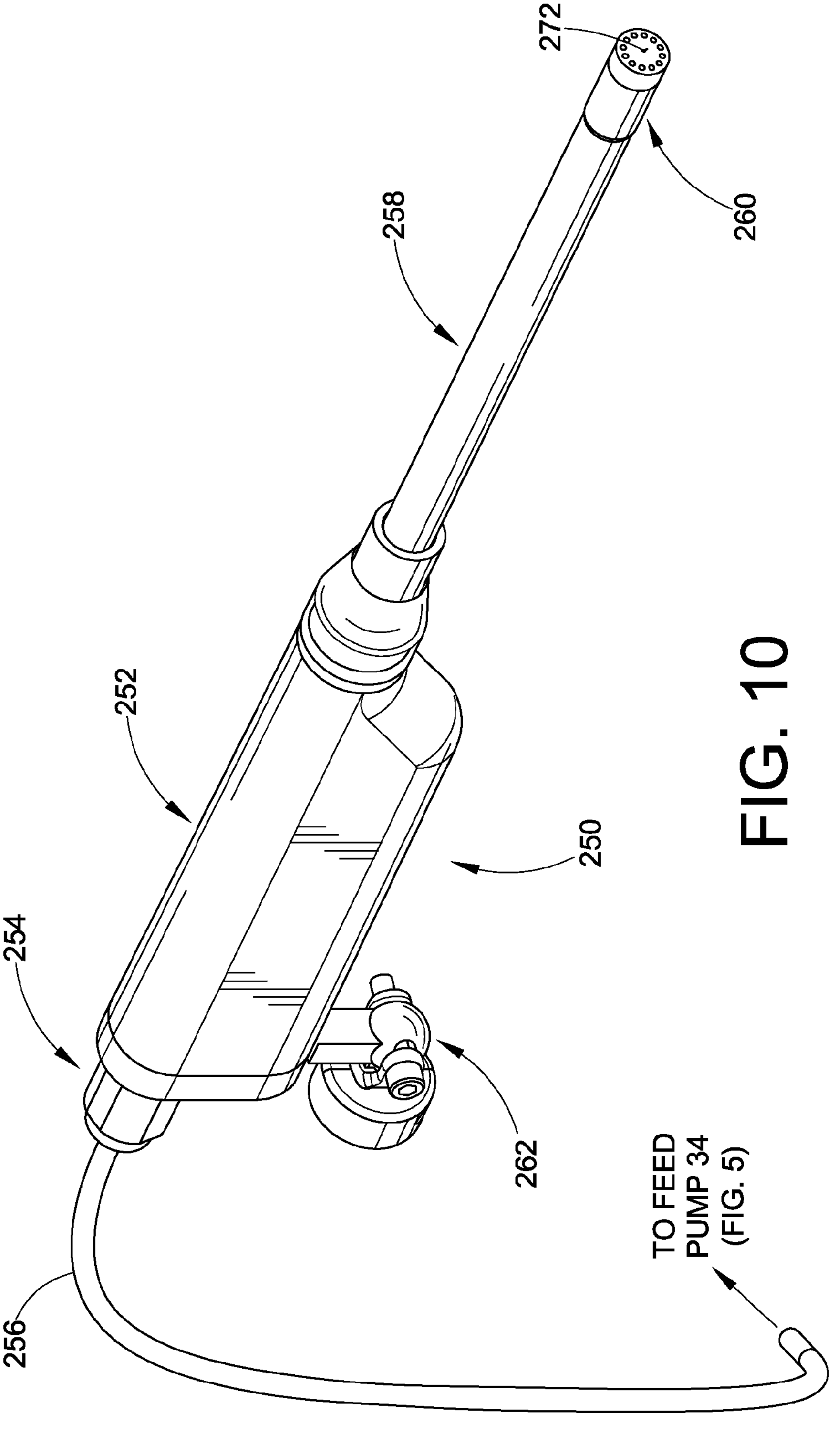
FIG. 10 is a perspective of an electrostatic spray gun.
Figure 11A:
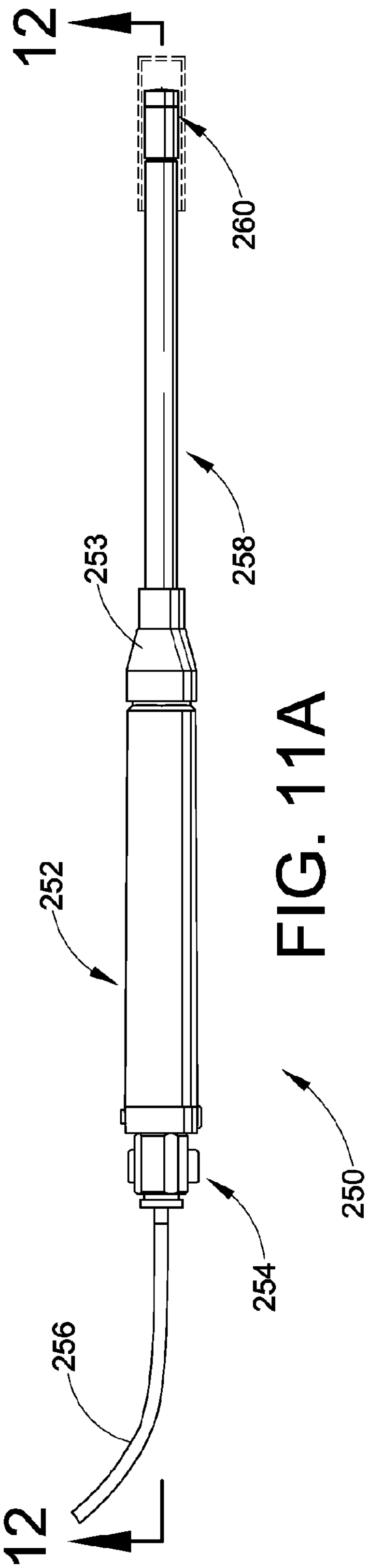
FIG. 11A is a top view of the spray gun of FIG. 10 with a container shown in phantom.

With reference to FIGS. 10 and 11A we illustrate an exemplary embodiment of an electrostatic spray gun 250 that may be used but need not be used, with the hopper concepts described herein above. Non-electrostatic spray guns may also be used. Thus, the spray gun 250 may correspond to the coating material applicator 202 of FIG. 5 herein. The spray gun 250 may include a main gun housing 252 having a powder inlet end 254 that receives a powder feed hose 256. The feed hose 256 is connected at its opposite end to the outlet of a feed pump, for example a feed pump 34 in FIG. 1. The feed hose 256 may correspond, for example, to the feed hose 42 of the FIG. 5 embodiment herein. The gun housing 252 is adapted for connection with a lance assembly 258. A nut 253 may be used to secure the lance assembly 258 to the main housing 252. The spray gun 250 is well suited for spraying the interior of long tubular containers, although it may be used with other containers as needed. The lance 258 includes a nozzle 260 at the distal end of the lance. The spray gun illustrated in FIG. 10 is a bar mount style gun and includes a bar mount assembly 262 to attach the spray gun 250 to a bar associated with a support structure for the gun (not shown), as is well known in the art. The spray gun may alternatively be a tube mount style gun in which the main gun housing 252 may be supported by a tubular member associated with a support structure of the spray gun. Manual spray guns may also be used.

Figure 12:
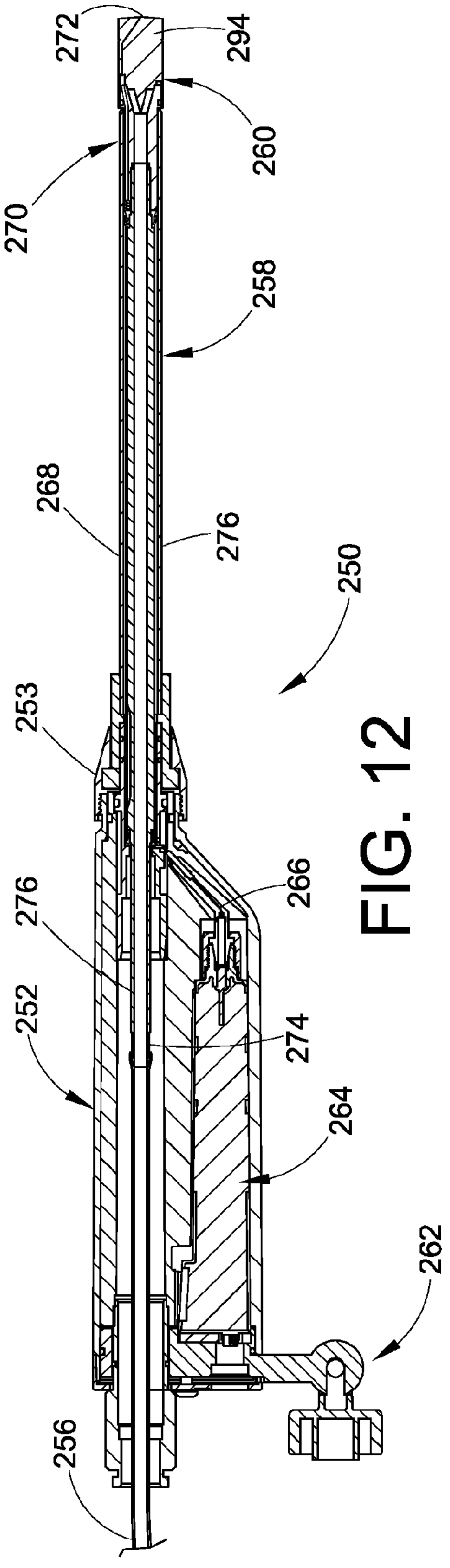
FIG. 12 is a longitudinal cross-section of the spray gun of FIG. 11A taken along the line 12-12.
Figure 15:
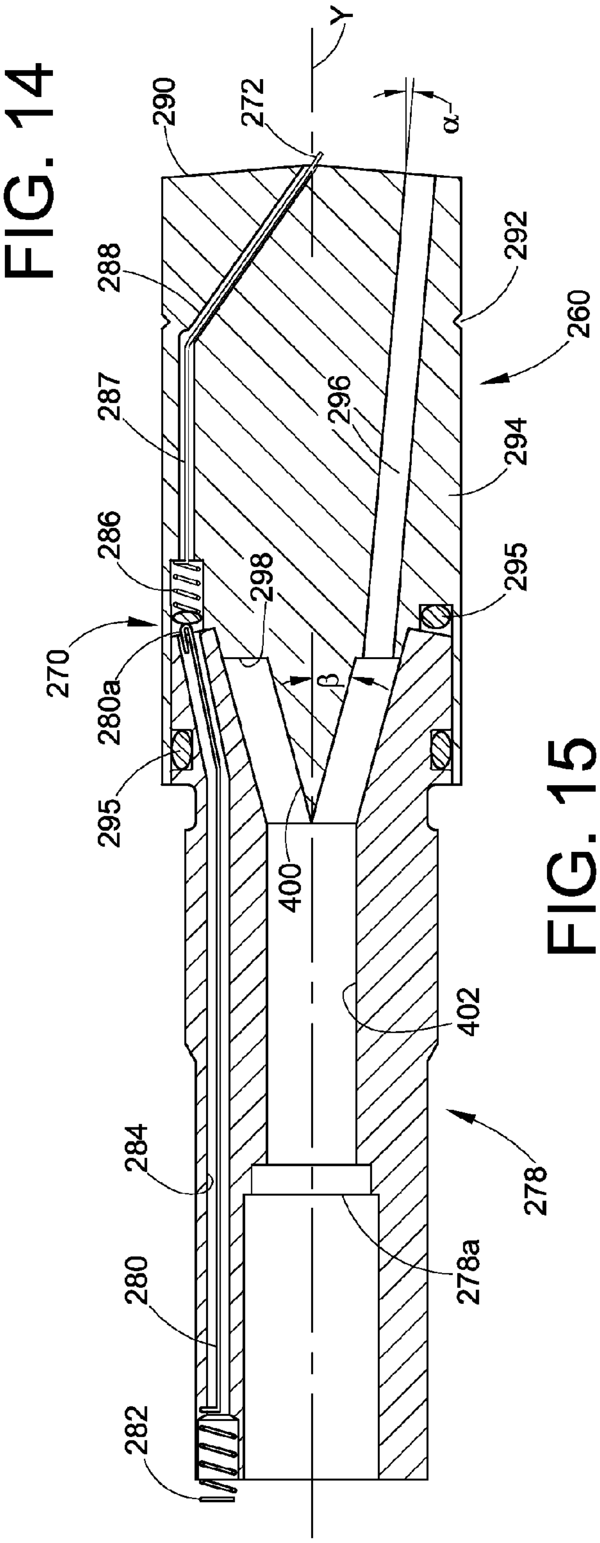
FIG. 15 is a longitudinal cross-section of the subassembly of FIG. 14 taken along the line 15-15.

With reference to FIG. 12, the main housing 252 encloses an internal high voltage multiplier assembly 264. The multiplier assembly 264 includes an output 266 that is electrically connected by a resistor/conductor assembly 268 to an electrode assembly 270 (FIG. 15). The multiplier 264 produces a high voltage output that is applied to a charging electrode tip 272 (also shown in FIG. 5) to electrostatically charge powder coating particles that exit through the nozzle 260.

The feed hose 256 extends into the main housing and fits over a barbed end 274 of a powder tube 276 that may be provided as part of the lance assembly 258. Preferably, although not necessarily, the powder tube 276 inside diameter is about the same as the inside diameter of the feed hose 256 that extends back to the feed pump outlet. The powder tube 276 extends through the lance assembly 258 up to an electrode assembly holder 278 (FIG. 15).

Figure 14:
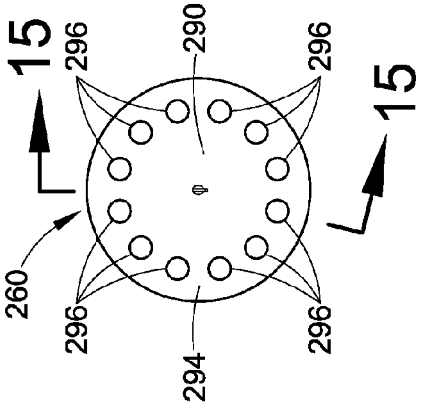
FIG. 14 is an end view of the subassembly of FIG. 13.
Figure 13:
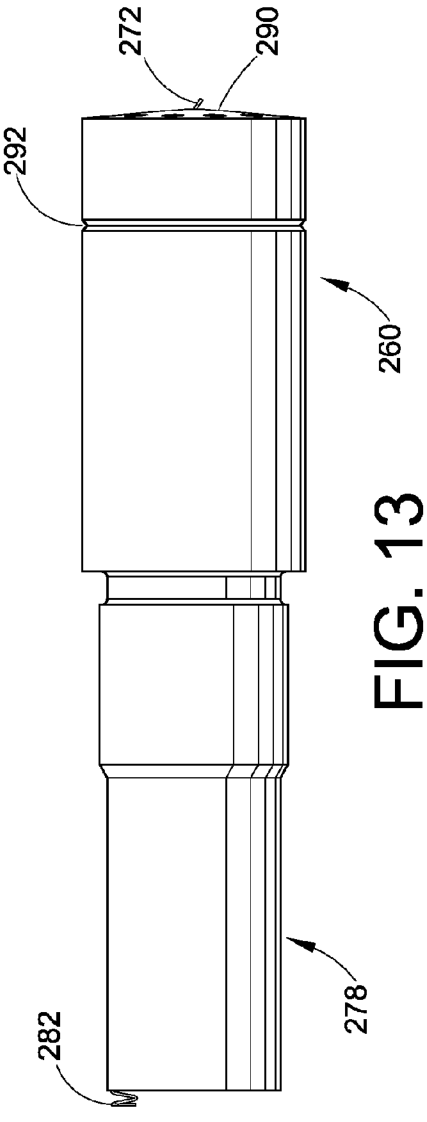
FIG. 13 is an elevation of an electrode and nozzle subassembly such as may be used with the spray gun of FIG. 10.

With reference to FIGS. 13-15, the electrode assembly 270 may include a first electrode wire 280 having a first contact spring 282, wherein the first electrode wire passes through a bore 284 in the electrode holder 278 and has a distal end 280*a* that makes electrical contact with a conductive seal member 295. The seal member 295 is axially compressed between the first electrode wire 280 and a second electrode contact spring 286 that is in electrical contact with a second electrode wire 287 that terminates at the electrode tip 272. The electrode 272 passes through a bore 288 in the nozzle 260 so that the electrode tip may be preferably positioned in the middle of the nozzle just forward of the nozzle face 290. The electrode holder 278 may include a bore 278*a* that receives the forward end of the powder tube 276 (FIG. 15).

The nozzle 260 may include nozzle information-related coding or indicia, for example, one or more optional grooves 292. These grooves 292 (one shown in FIGS. 13-15) may indicate the type of nozzle, such as the number of powder flow passage, angles of the passages, diameters and other information of interest. In addition to the number of grooves, the grooves may be colored to provide additional information. Many different shapes other than grooves, as well as combinations of shapes, size and color, including raised rings for example, may alternatively be used.

The charging electrode first contact spring 282 has a contact end that makes electrical contact with the resistor/conductor assembly 268 (FIG. 12). The applicator 250 may, alternatively, be configured as a non-electrostatic device as well.

Preferably the electrode tip 272 exits the nozzle 260 so as to be about in the center of the powder coating material spray pattern. The charging electrode 287 may pass through an outer portion of the nozzle 260 before terminating in the central region of the powder flow passages (296), or alternatively may extend straight through the center of the nozzle, for example. Still further the charging electrode may extend through a rib (not shown) along an outer periphery of the nozzle 260.

Figure 16A:
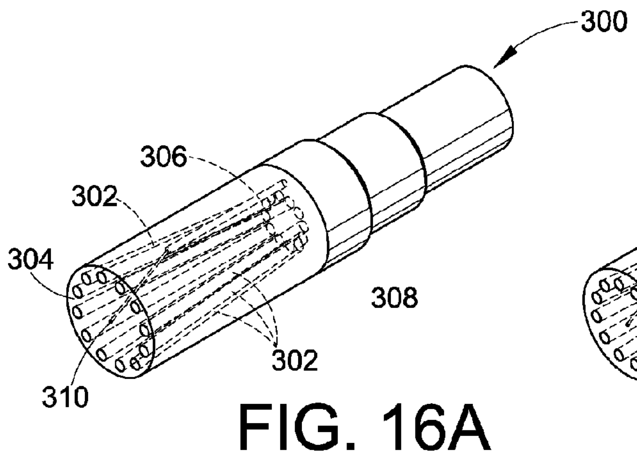
FIGS. 16A-16U illustrate various alternative embodiments for a nozzle.
Figure 16B:
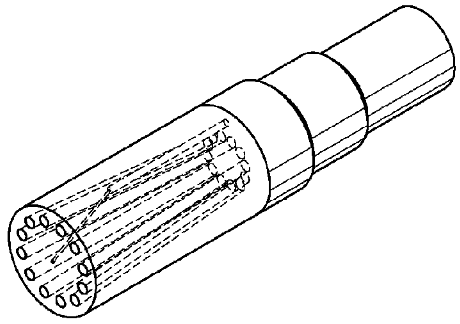
Figure 16C:
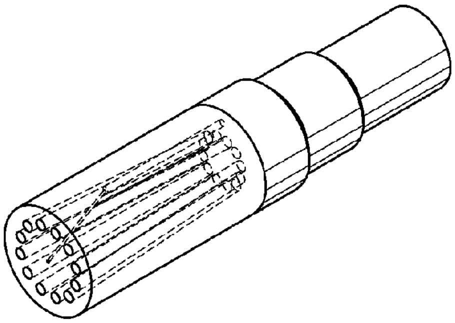
Figure 16D:
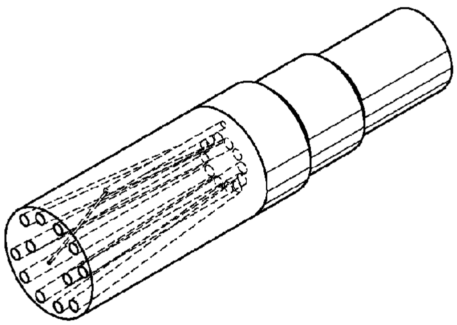
Figure 16E:
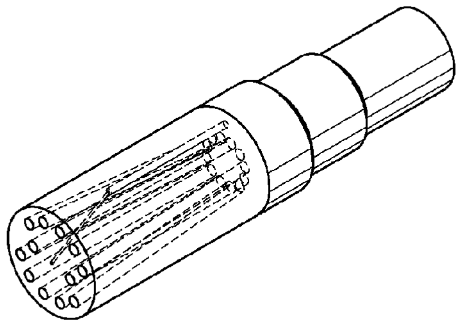
Figure 16F:
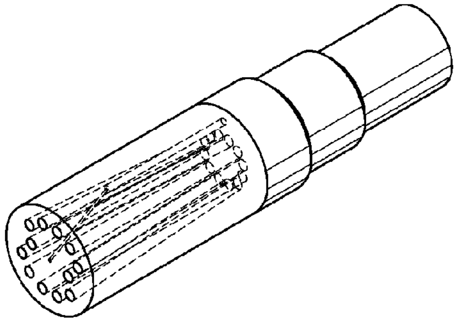
Figure 16G:
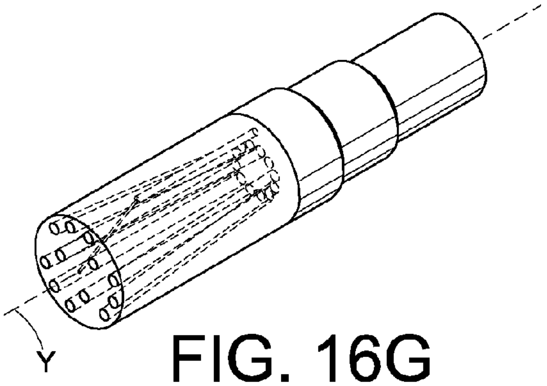
Figure 16H:
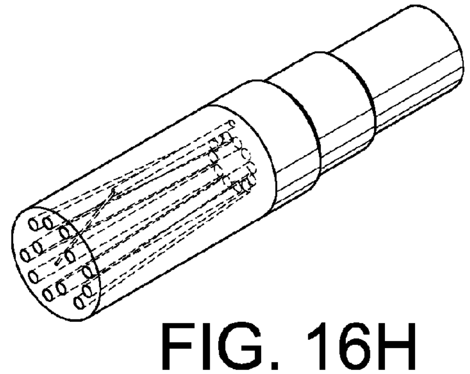
Figure 16I:
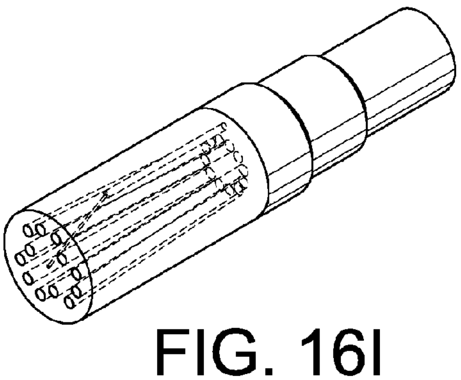
Figure 16J:
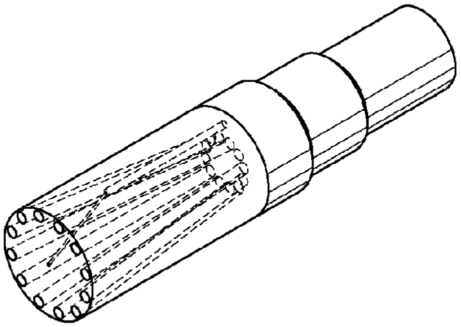
Figure 16K:
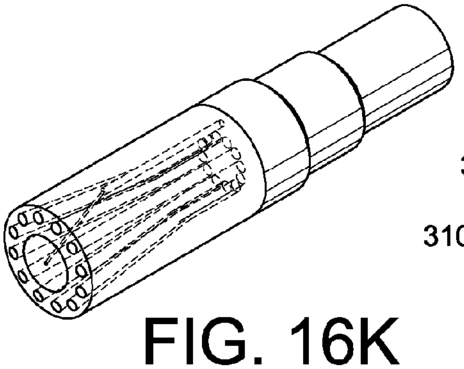

The nozzle 260 may include a main nozzle body 294 with a plurality of powder coating material flow passages 296 formed therein. The nozzle body 294 may be attached to the electrode holder 278 by any suitable arrangement, such as a press fit as illustrated in FIG. 15. Suitable seals such as the o-rings 295 may be used to contain powder coating material from escaping to the atmosphere, as well as from flowing down the electrode bore 288. The flow passages 296 are preferably although not necessarily discrete from each other. Because of the cross-section orientation of FIG. 15, only one flow passage 296 is shown, and in some applications as few as two flow passages 296 might be used. Any plurality number of flow passages 296 may be used, and we have found that three up to twelve such passages work well, particularly for interior coating of long narrow containers, to name one example. The embodiment of FIGS. 13-15 illustrate the use of twelve flow passages 296. In the exemplary embodiment of FIG. 15, the flow passages 296 diverge at an angle $\alpha$, which is the half angle referenced to the central longitudinal axis Y of the nozzle 260; however, as will be further explained herein, the flow passages 296 may take on more complex arrangements such as illustrated in FIGS. 16A-16U. In some applications, the angle $\alpha$ may be zero degrees meaning that the flow passages 296 extend parallel to the axis Y.

The flow passages 296 extend from an interior surface 298, about the base of a conical tip 400. The conical tip 400 extends axially rearward to assist uniform distribution of powder coating material that flows into the nozzle 260 to pass through the plurality of flow passages 296. The cone angle $\beta$, which is the half angle referenced to the axis Y, may be the same or different from the angle $\alpha$. Suitable but not required ranges for the angle $\alpha$ is about 0° to about 20° and will be determined in part by the internal diameter of the container being coated, as well as whether more than one nozzle is being used for a coating operation. Suitable but not required ranges for the angle $\beta$ is about 10° to about 15°, with 15° being illustrated in the drawings.

The use of the nozzle 260 and the flow passages 296 provide a more uniformly dispersed powder spray pattern than is achieved in prior nozzle designs. Accordingly, the nozzle 260 with a plurality of discrete powder flow passages 296 facilitate use of the applicator 250 to coat open or closed end containers while the container may be rotationally stationary during a coating operation. By “rotationally stationary” is meant that there is no relative rotation between the powder coating material applicator 250, such as the nozzle 296, for example, and the container being coated during a coating operation. In a more specific example, the container may be coated without having to rotate the container itself. The use of discrete multiple flow passages also produces a more uniform film thickness. Can or nozzle rotation may be alternatively used as needed.

For electrostatic embodiments, placing the charging electrode tip 272 in about the center of the spray pattern improves the charging of the powder particles, particularly with the more uniform distribution of powder in the spray pattern due to the use of the nozzle 260 with a plurality of discrete flow passages 296.

Each flow passage 296 in the exemplary embodiment has a circular cross-section and a diameter that is constant along the entire length of each flow passage. However, such geometry is not required, and may be changed as needed to achieve particular spray patterns, flow velocities and so on. For example, the flow passages might alternatively have a varying diameter, or may have a cross-sectional shape other than circular. The discrete flow passages 296 open at an end face of the nozzle 260 (see the examples below), with the openings preferably being evenly spaced about the longitudinal axis of the nozzle. It is further preferred, although again not required, that the total cross-sectional area of the flow passages be at least equal to or greater than the cross-sectional area of the nozzle inlet flow passage 402 that is just upstream from the nozzle 260. The cross-sectional area of the nozzle inlet flow passage 402 is preferably but need not be about the same as the cross-sectional area of the inside diameter of the powder tube 276, such that there is a generally constant cross-sectional area for the powder flow path that extends from the outlet of the feed pump 34 all the way through the nozzle 260.

FIGS. 16A-16U illustrate a wide variety of different nozzle 300 designs, in particular for the configuration of a plurality of discrete powder flow passages 302. The variations involve various angles and directions of powder flow, along with different end pattern configurations where the flow passages open at the end face 304 of the nozzle. For example, FIGS. 16A-16J illustrate diverging angles wherein various ones of the discrete passages may have the same angle or different angles relative to a central longitudinal axis Y of the nozzle. Exemplary angles may be in the range of about three to about eighteen degrees relative to the Y axis for the primary powder passages. The passages may have a uniform diameter, for example about 2 millimeters. Note also that in all of the embodiments of FIGS. 16A-16U, the charging electrode 306 extends from a radially outer portion of the nozzle body 308, but that the charging electrode tip 310 preferably although not necessarily is disposed in about the central region of the spray pattern.

Figure 16L:
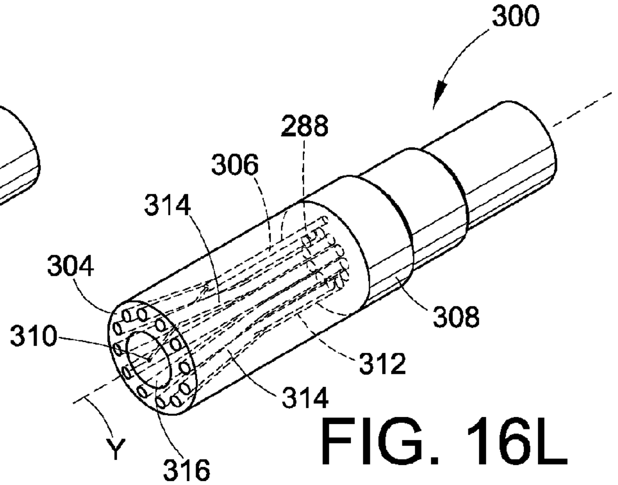
Figure 16M:
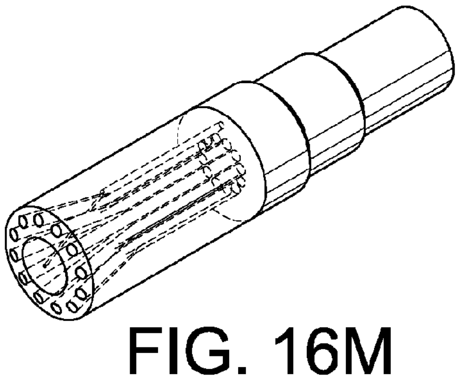
Figure 16N:
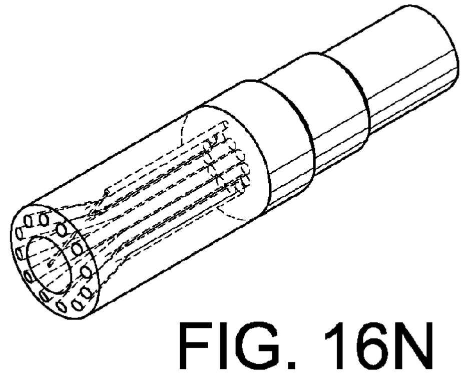
Figure 16O:
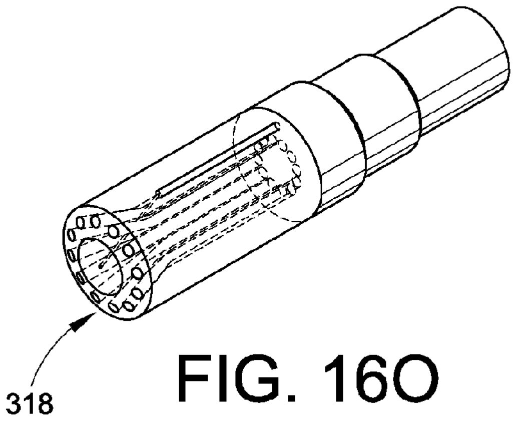
Figure 16P:
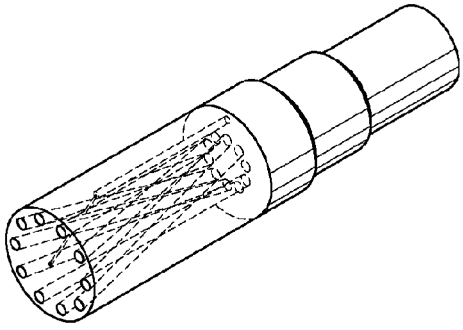
Figure 16Q:
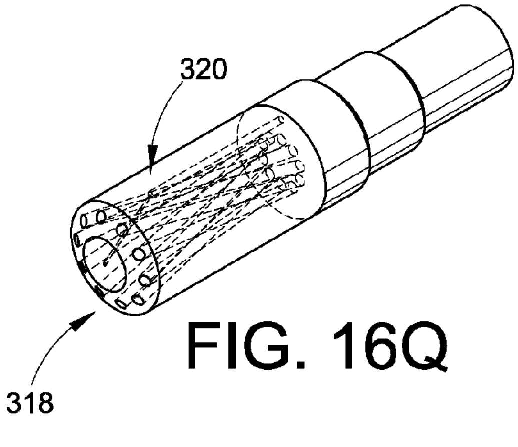
Figure 16R:
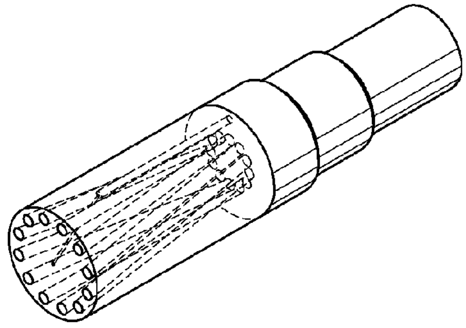
Figure 16S:
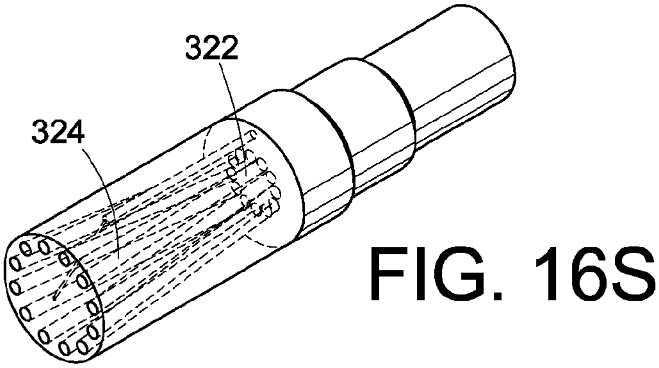
Figure 16T:
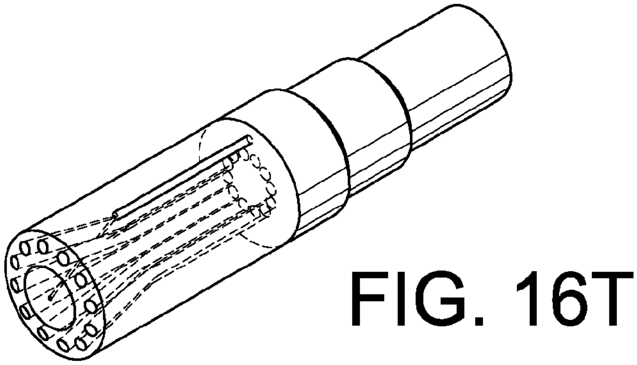
Figure 16U:
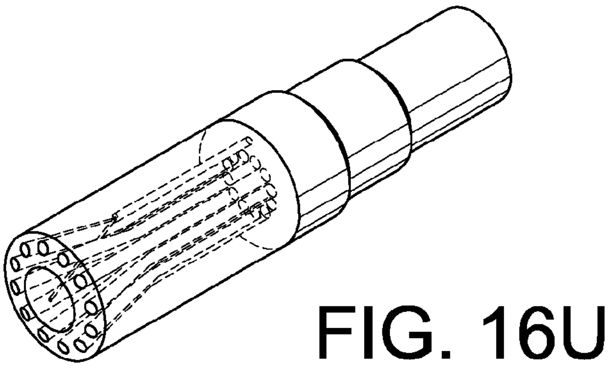

FIGS. 16K-16O, 16T and 16U illustrate examples of compound flow passages in which the flow passages may include a straight portion 312—meaning that the flow passage is generally parallel the central axis Y or at zero degrees—before diverging as along 314 (see for example FIG. 16L, for simplicity we only label FIG. 16L). Again, different divergence angles may be used for various of the discrete flow passages within a nozzle so as to select a particular end face pattern. Note also that some of these exemplary designs include a central cone or other raised portion 316 in the nozzle end face. In other embodiments, the end face 318 (see FIG. 16O for example) may be raised, dome shaped or have other profiles as needed. In the embodiments of FIGS. 16A-16J and others, for example, the end face 304 is flat. In all the embodiments, such features including the end face geometry and the end face pattern of the flow passages 302, may be used to effect a particular spray pattern effect from the nozzle 300.

FIGS. 16P-16R illustrate embodiments wherein the flow passages 320 diverge not only axially but also radially, having the appearance of crossing over each other or a twist arrangement (see for example, FIG. 16Q). Such an arrangement may be used, for example, to impart a swirl effect to the spray pattern. As still another alternative illustrated in FIG. 16S, a flow passage may include a first portion 322 that diverges away from the central axis Y and a second portion 324 that converges back towards the axis Y.

Figure 11B:
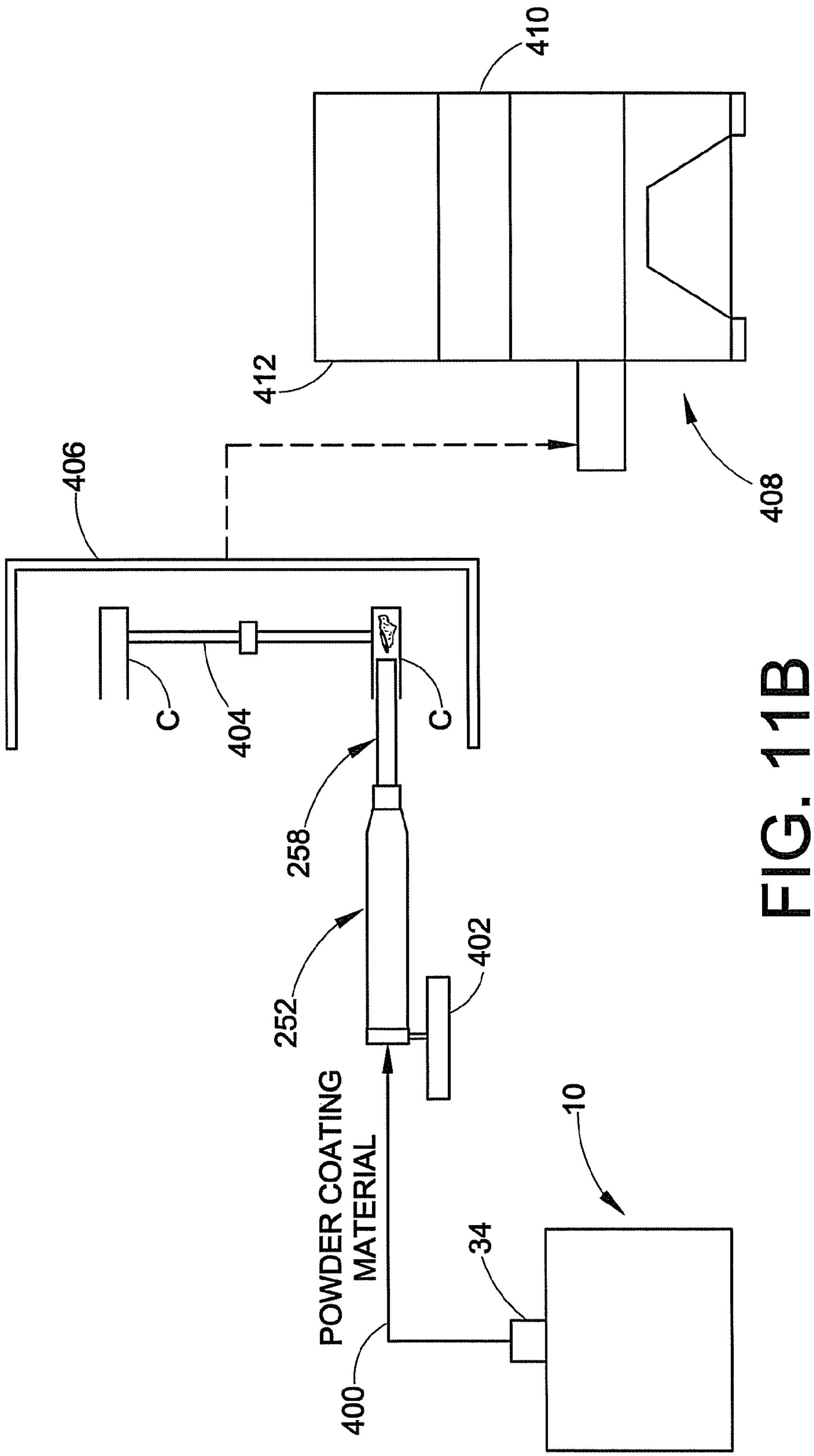
FIG. 11B is a schematic diagram of a powder coating application system for tube coating.

An example of a typical tube shaped container C that may be coated with the apparatus disclosed herein is illustrated in phantom in FIG. 11A, and a system for coating the container is illustrated in FIG. 11B. With reference to FIG. 11A, a typical tube shaped container C may be, for example, an aerosol can for hairspray, or a metal water bottle. Suitable containers may have an axial length that is about three times the container diameter, and a typical diameter range of about a half-inch or greater, with lengths about one and one-half inch or greater; with a typical range being about one inch in diameter and a length of about three inches to about six inches or more in length for an aerosol can, and about two inch diameter and a length of about six to twelve inches for a metal water bottle, to name two examples; however, these dimensions are intended to be only exemplary numbers and not limiting as to the use of the inventions. Note that the lance 258 may be sufficiently elongated so as to allow the nozzle 260 to be positioned well inside the container. The length of the lance 258 may be changed as needed to accommodate different length and internal diameter containers. The combination of the hopper 10 with a quiet zone from which powder is sucked out of the hopper, which powder is then conveyed to the spray gun 252 and out a nozzle 260 having a plurality of discrete coating material flow passages 296 evenly disposed about a longitudinal axis of the nozzle, and that open on an end face 304 of the nozzle, allows for very efficient coating of the container C interior surfaces without any need to rotate the container relative to the nozzle 260 during the coating operation. Accordingly, such an apparatus may be used to carry out another method of this disclosure, in which fluidized powder coating material is drawn from a quiet zone of a powder coating material hopper, conveyed to a spray gun and out a nozzle having a plurality of flow passages, to coat an interior surface of an elongated tubular container. In alternative embodiments of the method, the coating operation may be performed with relative rotation between the nozzle of the spray gun and the container surface. In another embodiment, powder is supplied to the hopper in an annular region outside the quiet zone from which powder coating material is sucked out by a pumping action. In still another alternative embodiment, powder is supplied to the hopper in a central region separated by a baffle from an annular quiet zone outside the baffle, and powder coating material is sucked out of the quiet zone by a pumping action.

With reference to FIG. 11B, the hopper 10 of this embodiment supplies powder through a pump 34 via a hose 400 to spray gun 252. The spray gun 252 may be mounted on a reciprocator 402 to reciprocate the lance 258 of the gun 252 into and out of the container C. The container C is mounted to a star wheel 404 which indexes the container into position in front of the spray gun 252. Typically the containers C are held onto the star wheel 404 by vacuum chucks and conventional equipment is used to load containers C onto the star wheel prior to coating and unload them from the star wheel after they have been coated. An overspray collection hood 406 is connected to a powder overspray collection system 408 that recovers any powder coating material which does not adhere to the container C. The overspray collection system 408 may be of a convention type and will include, for example, a vacuum source 410, such as a fan, to drawn transport air-entrained powder from the hood 406 and convey the air-entrained powder onto the exterior of filter cartridges (not shown) where the powder is separated from the transport air and typically periodically reverse air pulsed off the cartridges and collected in a hopper (not shown) in the bottom of the collection system 408. A final filter, or after-filter, 412 traps any residual powder that passes through the filter cartridges before the transport air is discharged from the overspray collection system 408.

The inventive aspects have been described with reference to the exemplary embodiments. Modification and alterations will occur to others upon a reading and understanding of this specification. It is intended to include all such modifications and alterations insofar as they come within the scope of the appended claims or the equivalents thereof.

We claim:

1. A powder coating system having a hopper for powder coating material, comprising:

a hopper body comprising a cylinder, a cover at an upper end of the hopper body, a fluidizing bed at a lower end of the hopper body, a baffle inside the hopper body and extending towards the fluidizing bed, the baffle comprising a cylinder of smaller diameter than the diameter of the cylinder of the hopper body so as to form an annular region between the hopper body and the baffle, at least one powder inlet disposed to feed powder into the hopper body, the powder inlet being disposed in the annular region, the baffle defining a zone inside the baffle, a powder outlet for removing powder from the zone inside the baffle.

2. The powder coating system of claim 1 wherein a lower gap is provided between the bottom of the baffle and the fluidizing bed, and an upper gap is provided between the baffle and the cover.

3. The powder coating system of claim 1 comprising an agitator disposed in the hopper, the agitator being operable to stir fluidized powder in the hopper.

4. A powder coating system having a hopper for powder coating material, comprising:

a hopper body comprising a cylinder a cover at an upper end of the hopper body, a fluidizing bed at a lower end of the hopper body, a baffle inside the hopper body and extending towards the fluidizing bed, the baffle comprising a cylinder of smaller diameter than the diameter of the cylinder of the hopper body so as to form an annular region between the hopper body and the baffle, at least one powder inlet disposed to feed powder into the hopper body, the powder inlet being disposed in the annular region, the baffle defining a zone enclosed within the baffle, a powder outlet for removing powder from the zone enclosed within the baffle, a pump connected to the powder outlet, and a powder spray gun connected to the pump.

5. The powder coating system of claim 4 wherein a lower gap is provided between the bottom of the baffle and the fluidizing bed, and an upper gap is provided between the baffle and the cover.

6. The powder coating system of claim 4 comprising an agitator disposed in the hopper, the agitator being operable to stir fluidized powder in the hopper.

7. The powder coating system of claim 4 wherein the spray gun is mounted on a reciprocator to reciprocate the gun into and out of a container.

8. The powder coating system of claim 4, wherein the spray gun has a nozzle, the nozzle comprising a plurality of discrete flow passages disposed about a longitudinal axis of the nozzle, and further comprising an electrode, the electrode extending through the nozzle along a longitudinal axis of the nozzle.

9. The combination of claim 8 wherein the discrete flow passages are disposed uniformly about a tip of the electrode that extends from an outlet end of the nozzle.

10. A hopper for powder coating material, comprising:

a hopper body comprising a cylinder a cover at an upper end of the hopper body, a fluidizing bed at a lower end of the hopper body, a baffle inside the hopper body and extending towards the fluidizing bed, the baffle comprising a cylinder of smaller diameter than the diameter of the cylinder of the hopper body so as to form an annular region between the hopper body and the baffle, at least one powder inlet disposed to feed powder into the hopper body, the powder inlet being disposed in the annular region, the baffle defining a zone enclosed within the baffle, a powder outlet for removing powder from the zone enclosed within the baffle.

11. The hopper of claim 10 wherein a lower gap is provided between the bottom of the baffle and the fluidizing bed, and an upper gap is provided between the baffle and the cover.

12. The hopper of claim 10 comprising an agitator disposed in the hopper, the agitator being operable to stir fluidized powder in the hopper.

* * * * *